(12) United States Patent
Jia et al.

(10) Patent No.: US 6,947,593 B2
(45) Date of Patent: Sep. 20, 2005

(54) DIGITAL IMAGE PROCESSING

(75) Inventors: Charles Jia, San Diego, CA (US); Guo Li, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 09/972,693

(22) Filed: Oct. 5, 2001

(65) Prior Publication Data

US 2003/0068081 A1 Apr. 10, 2003

(51) Int. Cl.$^7$ ............................................... G06K 9/00
(52) U.S. Cl. ..................... 382/167; 382/162; 382/169; 382/254; 348/587
(58) Field of Search ..................... 382/162, 164–167, 382/169, 118, 260, 254, 255, 305, 309; 358/451, 453, 1.15, 302, 402; 430/263, 256; 348/61, 578, 586–587; 715/500, 500.1

(56) References Cited

U.S. PATENT DOCUMENTS

| | | | |
|---|---|---|---|
| 5,539,524 A | * | 7/1996 | Hasebe et al. .............. 358/296 |
| 6,226,455 B1 | * | 5/2001 | Ishimoto et al. ................ 396/2 |
| 6,750,890 B1 | * | 6/2004 | Sugimoto .................... 715/838 |
| 2002/0181767 A1 | * | 12/2002 | Deng et al. .................. 382/165 |

* cited by examiner

Primary Examiner—Kanjibhai Patel
Assistant Examiner—Ali Bayat

(57) ABSTRACT

A method of processing a color digital image file provides a "metallic," or a "sepia," or an "antiqued" image file. The resulting image files may be viewed, for example, on a computer monitor, or may be printed out in hard copy form using a black-and-white or color printer. A color photocopy machine which has a digital image output may be used to produce the original image file, and such a color photocopier (if it will accept digital image files), may also be used to produce the output hard copy printouts of processed image files. Thus, such a digital photocopier may be configured internally to also process image files, and may be employed to selectively process images copied on the machine into the user's choice of a metallic, a sepia, or an antiqued image on the output hardcopy of the color photocopier.

16 Claims, 4 Drawing Sheets

DIGITAL IMAGE PROCESSING

BACKGROUND OF THE INVENTION

1. Field of the Invention

This invention relates generally to processing of an image digitally in order to alter or improve the appearance of the image. More particularly, the present invention relates to the digital processing of an image in order to alter the appearance of objects seen in the image. According to one embodiment of the invention, objects seen in an image may be modified in color, in reflectivity, and in vividness in order to give these objects a "metallic" appearance. According to other embodiments of the invention, photographic techniques or technologies may be replicated. For example, the old time photographic technique know as "sepia" may be recreated on a digital image made from a digital image, snapshot or photograph. Similarly, another embodiment of the invention may be used to recreate an "antiqued" type of image in which a digital image or photographic image is given the patina and faded, softened colors of an old photograph of many years age.

2. Related Technology

It is well understood that the appearance of colors and images as perceived by the human eye is influenced by values known as hue or color; as lightness, brightness, value, or reflectance; and as vividness, saturation, or chroma. Many color scales, so called "color spaces," and measurement techniques are used in various technologies and industries in order to convey color values in numerical terms. For example, one such color value measurement system is published by the organization known as CIE (Commission International de l'Eclairage), and is referred to as the CIE L*a*b color scale. This color scale or "color space" know as the L*a*b color scale, dates from about 1976 and is based on the earlier CIE Yxy, or XYZ tristimulation scale of 1931. The Hunter Lab "color space" is commonly used in the paint industry, while the CIE L*a*b color space is used in printing commonly. Other color spaces are know, such as the L*C*h (Luminance, Chroma, Hue) color space. In other cases, the spectral values of colors as measured by a spectrophotometer are used to indicate colors, and particularly the differing appearance of colors (or metamerism) when viewed in various kinds of light.

Particularly interesting in this respect is the appearance or perception that humans have of metallic surfaces. The reflectance and color values of metallic surfaces are well known to humans. Humans are able to identify various metallic surfaces, such as polished, grit blasted, or burnished stainless steel, for example. Polished Copper, or polished Chrome are other metallic surfaces which humans identify easily. Generally, people identify a wide range of surfaces as "metallic" whether they be polished or not. That is, the visual appearance of various metals, whether or not they present polished or burnished metal surfaces, is well know to humans. Further, it would be desirable if images of surfaces and objects which are not actually made of metal could be made to have the "metallic" appearance. One embodiment of this invention allows a digital image to be processed so that objects in the image take on a metallic appearance.

Similarly, photographic techniques, such as "sepia" photographic prints are interesting visual techniques not commonly used in modem photography. "Sepia" is a tan/brown pigment obtained from an ink-like secretion of various cuttlefish. However, a "sepia" photographic technique was used more commonly years ago to give photographic images a brown, grayish brown, or olive brown patina. For purposes of artistic value, or novelty, or simply to create artistic effects, it would be desired to be able to recreate in modern images the old "sepia" appearance of images. With digital photography becoming ever more popular, the ability to take a digital photographic image and produce a "sepia" printed or displayed image would be desirable.

So to, it is known that old photographs with age take on a patina and appearance of age. That is, the colors soften, surfaces become somewhat more "dull" in appearance, and the image overall has an "aged," or "antique" appearance. This "antique" appearance of old photographic images would be desirable to replicate using modern photographs and images.

SUMMARY OF INVENTION

Accordingly, the present invention provides a method of manipulating a digital image so that the image takes on the appearance of including "metallic" objects, of a "sepia" photograph, or of an "antiqued" (i.e., aged) photograph.

Other objects, features, and advantages of the present invention will be apparent to those skilled in the pertinent arts from a consideration of the following detailed description of exemplary preferred embodiments of the invention, when taken in conjunction with the appended drawing figures, which will first be described briefly.

BRIEF DESCRIPTION OF THE DRAWING FIGURES

Figure 5A:
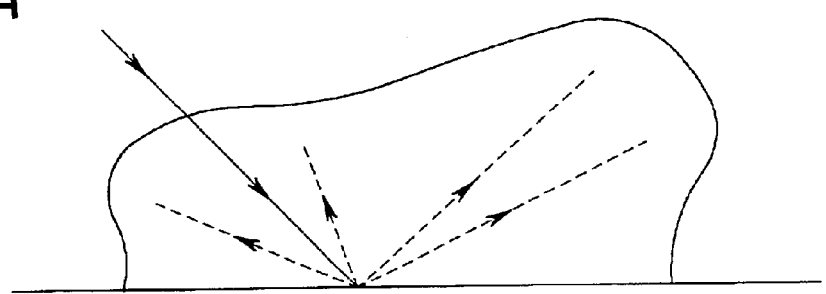
Figure 5B:
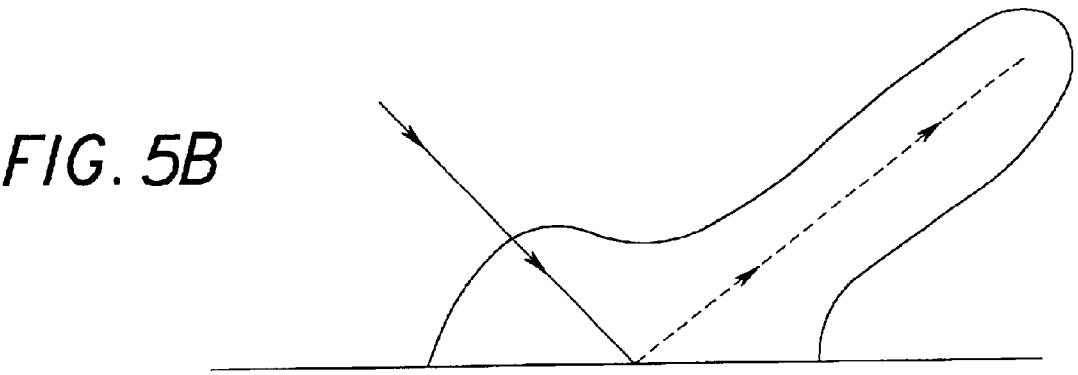

FIG. 5A graphically represents an exemplary light diffusion which may be representative of light incident upon a non-metallic surface; and FIG. 5B graphically represents an exemplary light diffusion which may be experienced when light is incident upon a metallic surface.

DETAILED DESCRIPTION OF PREFERRED EXEMPLARY EMBODIMENTS OF THE INVENTION

Figure 1:
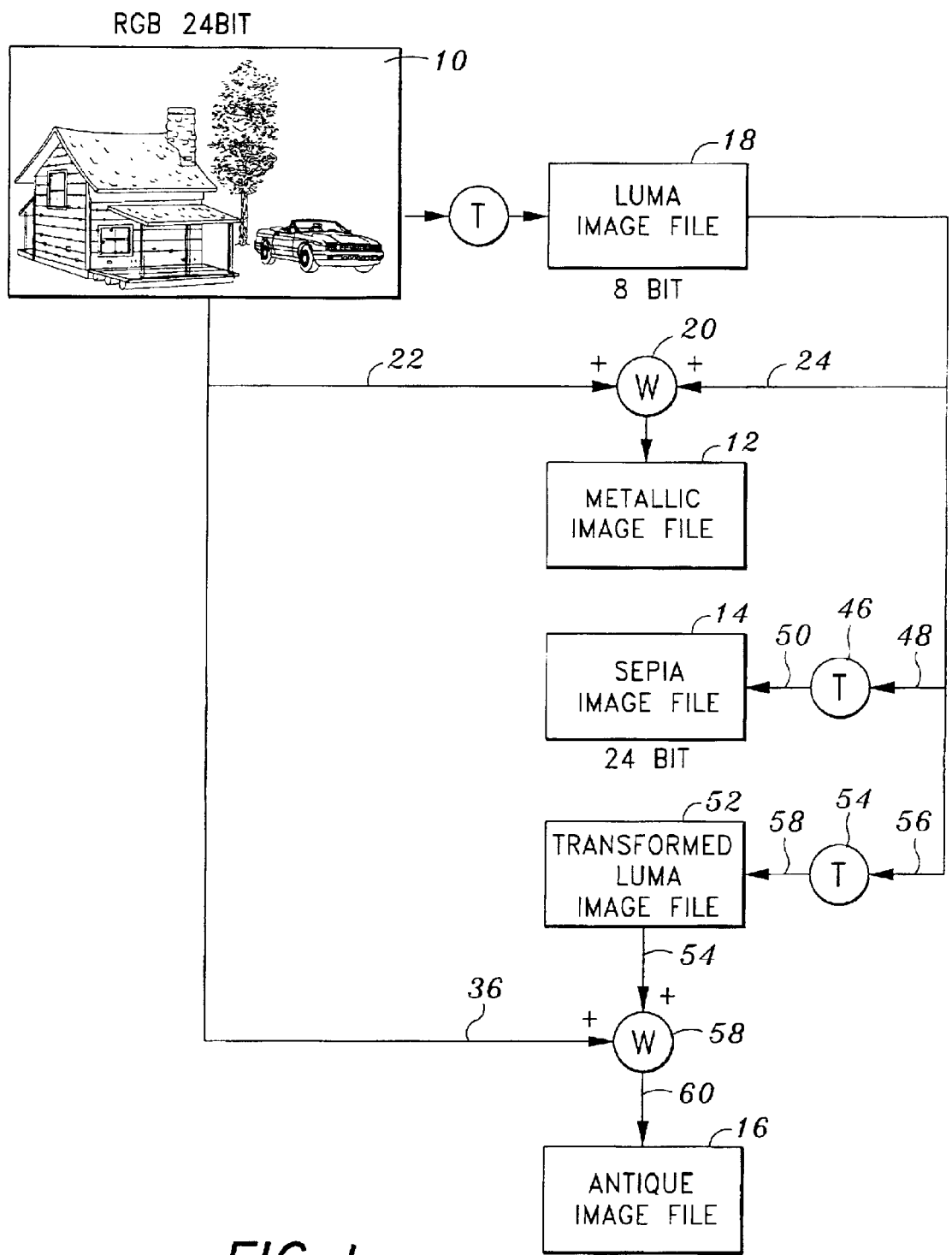
FIG. 1 is a diagrammatic illustration of a digital image processing technique used according to the present invention to create output image files of "metallic, or "sepia," or "antiqued" appearance.

Viewing now FIG. 1, a graphical or diagrammatic representation is set out which shows steps and methods in the conversion of a digital image file 10 into a selected one of a "metallic" image file 12, a "sepia" image file 14, or a "antiqued" image file 16. For purposes of convenience, and to better allow the reader to understand the present invention, the image file 10 is illustrated as a color image of a scene including a tree, a house, and an automobile (which would include some metallic surfaces), although the invention is not so limited. For example, the image 10 may be a black-and-white image. The image 10 is represented as a red, green, and blue (RGB) image file, and may be in 24 bit color resolution, although again the invention is not so limited.

Further, the image file 10, as well as the output image files 12, 14, and 16, or any one of them, may be viewed, for example, on a computer monitor or screen, on the view screen of a digital camera, or may be printed out using a color printer. The color printer used may be of any kind, such as a color inkjet printer, or a color laser jet printer. Alternatively, a digital copier of the type that is capable of receiving a digital image file from an outside source may be used to print out any one of the image files 10–16.

The digital image file 10 may originate with any selected source. For example, the file 10 may originate with a digital camera (not shown in the drawing Figures) which the user may have used to snap a picture. Alternatively, the image file 10 may originate with a flat bed or page feed scanner (also not shown in the drawing Figures). The image file 10 may have originated from the internet, and may be an image that the user has downloaded. Still alternatively, the image file 10 may be a stock image of the kind that is provided with many software programs (so call, "clip art"), such as with scanner programs, printer programs, with photo editor programs, or with digital camera support programs. A digital copier which is capable of outputting digital image files may also be used to originate the image file 10.

Regardless of the source of the image file 10, this color image file is either originated in or is converted by the user to an RGB (red, green, blue) digital image file. In such a case, each pixel of the image file 10 will have color values associated with it that may be in 16 bit or 24 bit color, for example. Each pixel will also have luminosity values. In the event that the image file 10 is a black-and-white image file, then the gray scale values of the image file are used directly as explained below.

As a first step in creating any one of the "metallic," "sepia," or "antiqued" image files 12–16 the image file 10 is used to create (i.e., by use of a "transform" to be explained) an intermediate "gray scale," or luminosity (i.e., "luma") image file, indicated with the numeral 18 on FIG. 1. While a variety of methods are available and are possible of use to produce a gray scale image file from a color image file, a particularly preferred method is to transpose each pixel of the color image file 10 into a corresponding gray scale pixel according to the relationship:

$$0.299R+0.587G+0.114B=1.0G$$

In which R stands for the numerical value of the red component of a RGB color image pixel. Similarly, the "G" and "B" factors stand for the Green and for the Blue numerical values of the RGB color image pixels, and G stands for the gray scale numerical pixel value. The aggregate of all the gray scale pixel values makes up the gray scale image file 18. It is to be noted that in this example, the 24 bit RGB color file transposed to gray scale (luma) produces an 8 bit gray scale file. Further, it should be noted that the invention is not limited to use of this particular transform for converting a RGB image file into a gray scale file. For example, the coefficients could be altered or adjusted to accommodate differing input devices (i.e., a digital camera versus a color scanner, for example). Further, the coefficients can be expressed as fractional values rather than decimals in order to speed processing. For example, the values $^{64}/_{256}$, $^{150}/_{256}$, and $^{32}/_{256}$ could be used in fractional form.

Next, in order to create a selected one of the "metallic" image file 12, or the "sepia" image file 14, or of the "antiqued" image file 16, the gray scale image file 18 is utilized as follows:

In order to create a "metallic" image file 12, the gray scale image file and the RGB image file 10 are combined using a weighted averaging type of combination, indicated at 20 on FIG. 1. This combinational process step is indicated by arrows 22 and 24 in FIG. 1, both providing pixel values in to the weighted averaging process step indicated at 20. The combination of the image files 10 and 18 is performed numerically, averaging, pixel by pixel, to build up the "metallic" image file. The weighting percentage may be altered from the value preferred, and the invention is not limited to any particular weighting percentage. However, the preferred weighting percentage is 80 percent from the image 10, and 20 percent from the image 18.

The preferred weighting percentage explained above may be fixed, or alternatively, the weighing percentage of the combination "metallic" image may be selectively effected by the user if the user chooses, by using a weighted average, so that the contribution to each pixel of the "metallic" image file is other than 80:20 from each of the original RGB file 10 and gray scale image file 18.

Accordingly, the "metallic" image file 12 results, and may be viewed on any selected viewing device or may be printed out. FIGS. 5A and 5B provide a graphical representation of a typical difference in light diffusion (i.e., reflection and scattering) from a typical non-metallic (i.e., painted, for example) surface (FIG. 5A) and from a typical metallic surface (FIG. 5B). The exemplary non-metallic surface of FIG. 5A is considered to exclude highly reflective surfaces such as that of water, or glass, or polished stone, for example. Instead, FIG. 5A is intended to give a representation of the type of diffusion of incident light that human viewers are accustomed to experiencing in everyday life and from those numerous non-metallic surfaces about all of us. Viewing FIG. 5A, it is seen that the viewer of the surface will experience a diffusion of incident light, so that the viewer sees the surface and its color with rather strong diffusion of incident light, and with no particularly strong highlights on the surface. In contrast, a viewer of a metallic surface as is represented in FIG. 5B, will experience a comparatively lessened perception of the color of the surface, but will experience strong highlights caused by the directionality of the reflection from the metallic surface. In this case, the light reflection from the surface predominates over the light diffusion from the surface. Thus, the viewer sees highlights on the surface where the color of the surface is "washed out" but light reflection is strong.

Returning to a consideration of the image file 12, when this image file is viewed or printed out, the highlights that are present in this file will be accentuated. Further, less strong reflections of incident light, such as that seen in FIG. 5A from the non-metallic surface, will be accentuated to a degree that these reflections take on somewhat the appearance of a highlight as might be expected from a metallic surface. Accordingly, a viewer of the image file 12, will have the impression that the objects seen in the image are metallic, or have more of the light reflective (as opposed to light diffusing) characteristic with regard to incident light as is commonly associated with polished or burnished metallic surfaces. The overall effect is one of having the objects in the scene or image "metallized." As mentioned above, the resulting "metallic" image file 12 may be viewed on a computer monitor, or may be printed out using a color or black-and-white printer.

In order to create a "sepia" image file 14, the gray scale image file 18 is filtered or "transformed" using an especially configured color correction filter (i.e., an image processing algorithm), as is further explained below. A similar (but not identically the same) image processing methodology is most preferably utilized to produce the "antique" image file 16, as will be explained. However, before further attention is given to the details of processing the image files, attention needs to be given to the matter of how humans perceive colors, and differences in colors.

Figure 2:
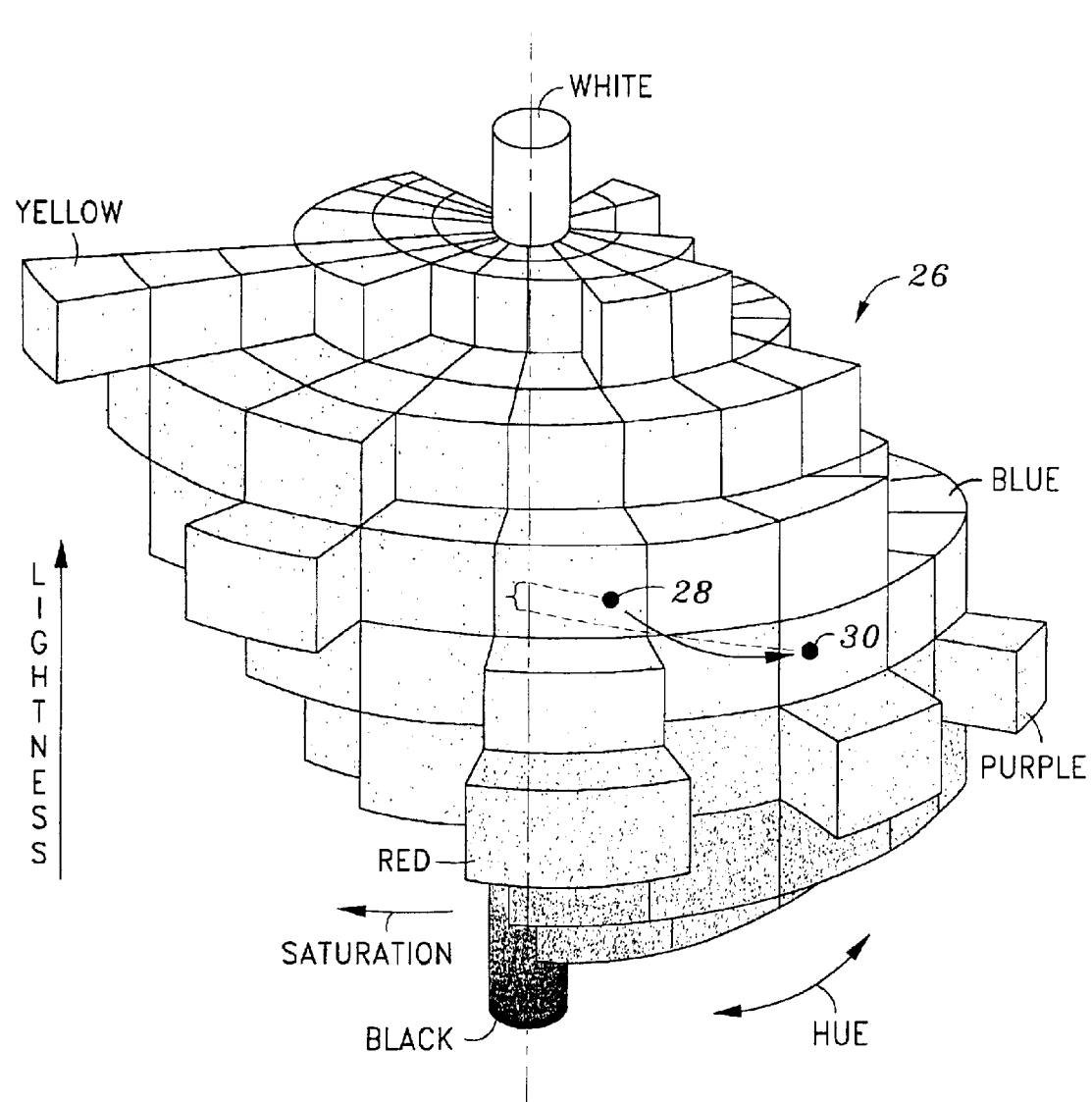
FIG. 2 is a graphical representation of a color solid, representative of colors and color hues and lightness as perceived by a human observer.

Viewing now FIG. 2, a "color solid" 26 is represented in black and white. This color solid would ordinarily have colors on it within the various segments. However, for the present purpose, representative colors are added to the color solid by use of labels. In this color solid, it is seen that the lightness values, various hues, and color saturations are represented by axial positions from top to bottom of the figure (lightness), circumferentially about the figure (hue), and from the center outwardly (color saturation). Thus, any particular color may be represented by defining a point within the color solid 26. This "tri-value" method of representing colors was explained briefly above, and is well understood in the art. Further, if a particular image pixel 28 of a RGB image (such as image 10) were to have the position shown in FIG. 2, this pixel would be perceived as having certain values of hue, lightness, and color saturation. Now, in order to transform this pixel to another pixel having a similar relationship to the other pixels of an image, the pixel could be "transformed" by shifting it (all other pixels of the image) a certain angle circumferentially, a certain difference in radius, and a certain distance axially on FIG. 2, to produce a pixel value at 30. If all of the pixels of an image were shifted or transformed identically the same with respect to their original positions in the color solid of FIG. 2, then the image formed by these pixels would be transposed by a constant photochromatic value.

Figure 3:
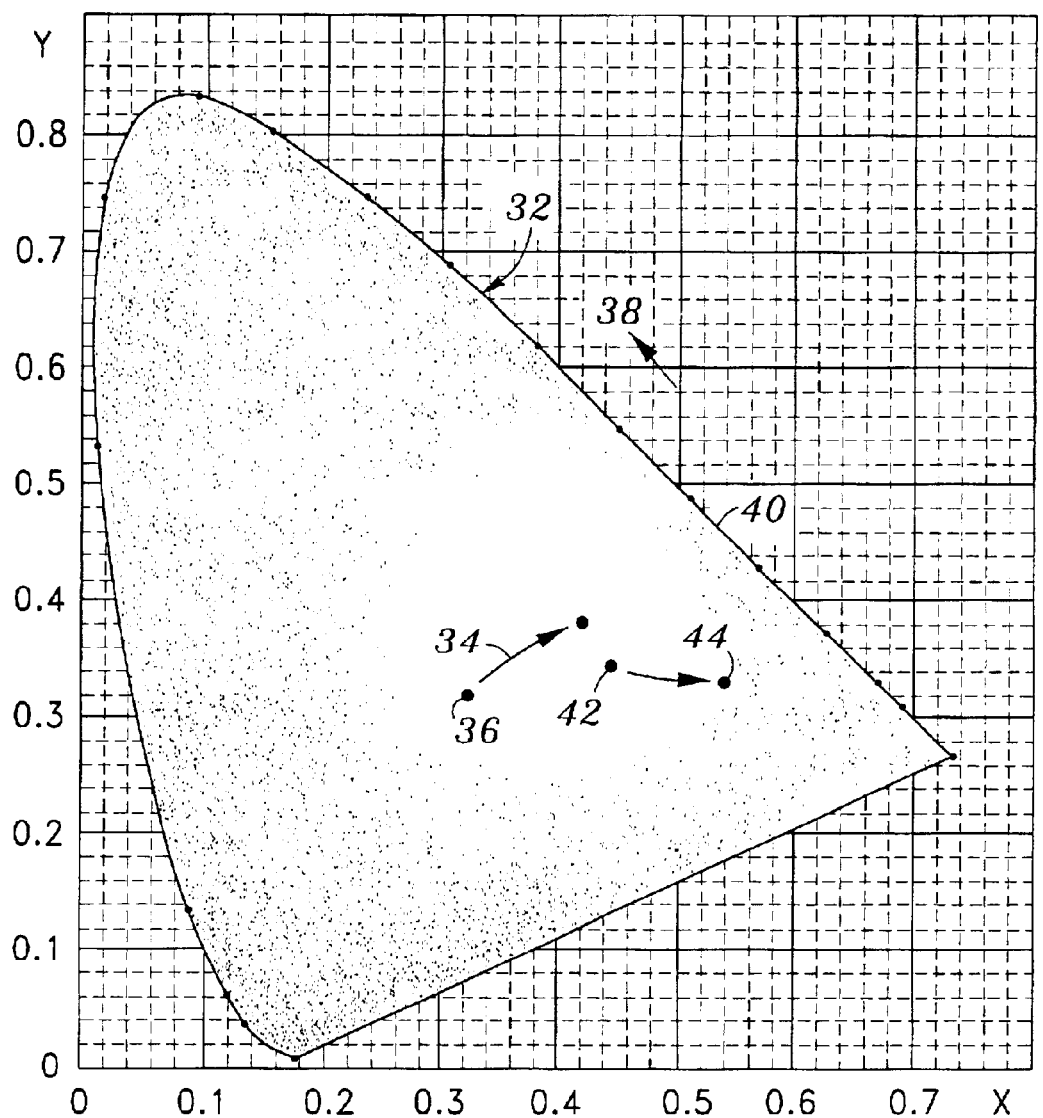
FIG. 3 is a graphical representation of a chromaticity diagram or space, showing color saturation and hue as perceived by a human observer.
Figure 4:
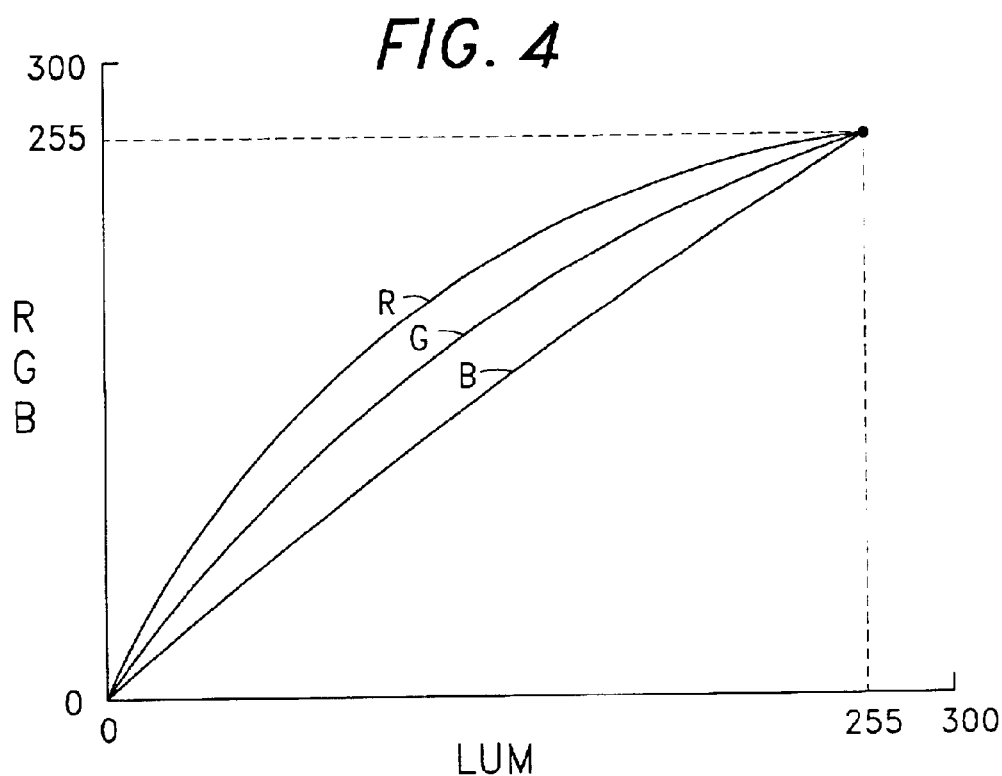
FIG. 4 is a graphical representation of an exemplary color space "filter" or transform used to transform luminosity information for image pixels to one of red, green, or blue color values in order to provide a selected one of an "antiqued" appearance or a "sepia" appearance to an image being processed.

Viewing FIG. 3, a chromaticity diagram is illustrated. Such a diagram is a two dimensional representation of a three dimensional color space of chromaticity. This color space 32 is an exemplary x, y chromaticity diagram. In this diagram, color chromaticity is represented by polar distance 34 from a central area 36 of the diagram. Color hue is represented by distance 38 along a peripheral curve 40. The diagram of FIG. 3 is independent of lightness value. However, a number of such diagrams like that illustrated at 32 of FIG. 3, each representing a particular lightness level could be used to produce a three dimensional color "solid" similar to that of FIG. 2.

In the color diagram 32 of FIG. 3, a particular pixel 42 might be represented at the point indicated. A transformation of this pixel from location 42 to location 44 (independent of lightness in this case) would represent a certain transformation of this pixel. As was discussed above, if all of the pixels of an image were represented in color diagrams like that of FIG. 3, and were then "transformed" by a constant distance and constant direction relative to their original position, the transformation would represent a constant photochromatic transformation for the image made up by all the pixels in aggregate.

However, in view of the above, it can be appreciated that using a color space type of transform or a color diagram type of transform for altering the appearance of an image can be very complex and very complicated. Further, these types of color space (or color solid), or color diagram transformations of image files for a digital color image would be very computationally intensive. Still further, and as will be seen below, it may not be desirable for an image to be transformed by a constant photochromatic variable. That is, the image may need to be altered differently dependent upon the color values of various pixel elements of the image.

Accordingly, preferred image color correction filters (i.e., transforms) are preferably effected by the use of look up tables. One look up table is used as a "sepia" transform, and a similar look up table is utilized in order to produce the "antiqued" image file 16. The creation of these look up tables is explained immediately below:

An equation preferably used to create each look up tables is:

$$\text{min}=\text{MIN3}(R\text{para}, G\text{para}, B\text{para});$$

$$\text{tmp\_}R=(R\text{ para-min})/10.;$$

$$\text{tmp\_}G=(G\text{ para-min})/10.;$$

$$\text{tmp\_}B=(B\text{ para-min})/10.; \text{ for (ii=0; ii<=255; ii++)}$$

{tmp=(2*ii−255)^2/255; tmp_R2=tmp_R*(255−ii)/255; tmp_G2=tmp_G*(255−ii)/255; tmp_B2=tmp_B*(255−ii)/255; red_out[ii]=(int)(ii+Rpara−(Rpara*tmp/255)+tmp_R2); green_out[ii]=(int)(ii+Gpara−(Gpara*tmp/255)+tmp_G2); blue_out[ii]=(int)(ii+Bpara−(Bpara*tmp/255)+tmp_B2);} where the respective Rpara, Gpara, and Bpara for sepia effect are: 50, 34 and 10, and Rpara, Gpara, and Bpara for antique effect are: 57, 36 and 5.

Because, as will be explained, the antique effect is the result of a weighted combination of the original image file 10 and processed results, the way to use the table is different.

In the case of sepia, as follows:

$$\text{gray}=(64*R\text{in}+160*G\text{in}+32*B\text{in})/256;$$

$$R\text{out}=(\text{red\_out}[\text{gray}]);$$

$$G\text{out}=(\text{green\_out}[\text{gray}]);$$

$$B\text{out}=(\text{blue\_out}[\text{gray}]);$$

In the case of antique:

$$\text{gray}=(64*R\text{in}+160*G\text{in}+32*B\text{in})/256;$$

$$R\text{out}=(\text{red\_out}[\text{gray}]*3+R\text{in})/4.;$$

$$G\text{out}=(\text{green\_out}[\text{gray}]*3+G\text{in})/4.;$$

$$B\text{out}=(\text{blue\_out}[\text{gray}]*3+B\text{in})/4.;$$

The resulting look up tables are attached hereto Appendix A and as Appendix B, respectively relating to "sepia" processing of an image file, and to "antique" processing of an image. An example of a Sepia transform and of an Antique transformation follows:

Given Rin=75, Gin=125, Bin=48=>gray=103

=>sepia output

Rout=red_out[gray]=154

Gout=green_out[gray]=137

Bout=blue_out[gray]=113

=>antique output red_out[gray]=160 green_out[gray]=139 blue_out[gray]=107

Rout=(160*3+75)/4=139

Gout=(139*3+125)/4=136

Bout=(107*3+48)/4=92

Returning now to consideration of FIG. 1, it is seen that the sepia look up table (appendix A) is used to look up the pixel values for the resulting sepia image file based on the value of each pixel of the gray scale image file 18. This "filtering or transformation shifts the image into a preferred tan/brown/olive spectral portion, which viewers will generally associate with the old time "sepia" type of photograph. Thus, for example, a modern digital photo of people wearing old time garb (old time western wear, for example) can further be processed according to the present invention to provide a "sepia" image file. This processing by application of the transform (i.e., replacement of the gray scale pixel values according to the values shown in the look up table of Appendix A), is represented by 46 on FIG. 1. Arrow 48 represents providing of the values of the gray scale image file 18 into a digital processor, while the arrow 50 represents the outputting of the resulting sepia file pixel values into the resulting image file 14.

When this sepia image file 14 is viewed or printed out, the resulting image appears very similar to an old time sepia photograph so far as hue and general olive/brown coloration is concerned. Again, the processing (i.e., transformation) of the gray scale image file 18 to produce the sepia image file 14 is represented by arrow 46 on FIG. 1.

FIG. 1 also represents the processing of the gray scale image file 18 using another transform (i.e., the look up table appendix B) in order to provide a transformed Luma (i.e., gray scale) image file 52. In this case, the transform is indicated at 54, and the arrows 56, 58 are equivalent to arrows 48 and 50 discussed above. It will be noted that to the same extent that the sepia image file 14 is a "transformed luma image file," so to is file 52 such a transformed file originating with the luma file 18. The difference between the files 14 and 52 is a result of the differing transforms manifest in the two look up tables of Appendix A, and of Appendix B. Thus, an alternative embodiment of the present invention, which is further discussed below, utilized only a single look up table. Still alternatively, the weighting percentage may be altered from that set out above. That is, it is seen that the transforms for Sepia and for Antique differ according to a weighting factor built into the Antique transform. If this factor is omitted from the transform algorithm, then the look up tables would be the same and only one would be needed. Then a weighting percentage to produce an Antique image file would be 25% from the RGB file 10, and 75% from the transformed image file 52 (which would be the same as Sepia image file 14).

However, further considering the image processing methodology illustrated by FIG. 1, once the image file 52 is obtained by operation of the transform of the look up table of Appendix B on the luma (i.e., gray scale) image file 18, then another weighted combinatorial operation (like operation 20) is used to produce the antiqued image file 16. Further, this combinatorial processing is represented by arrows 54 and 56, respectively providing the pixel values of the image file 52, and of the image file 10 (i.e., the original image) into the combinatorial operation 58. In this case, the combinatorial process 58 utilizes a weighted average of 80% from file 10, and 20% from image file 52 in order to produce the numerical value for each pixel of image file 16. Arrow 60 represents the outputting of the pixel values for file 16.

Alternatively, recalling that the sepia image file 14 is a transformed luma image file differing from file 52 according to the manifestations of the two transforms represented by the two look up tables of Appendix A and of Appendix B, it should be realized that only a single look up table may suffice for both purposes. That is, instead of producing image file 52 in preparation for making the antiqued image file 16, it may be possible to use the sepia image file 14 in the combinatorial operations represented at 58. This will depend on the nature of the transform used, and the nature of the combinatorial operation. That is, a compromise look up table may be identified that is satisfactory for making both sepia images, and for allowing the sepia images to be used in making antique images. Perhaps a different weighting percentage would be used in the combinatorial operation 58 also. However, by this example, it is to be appreciated that both sepia and antique image files may be produced by the use of a single transform embodied in a single look up table, and that the invention is not limited to the use of separate transforms and look up tables for each of the sepia and antique image products.

As mentioned above, the resulting "sepia," and "antiqued" image files 14 and 16 may be viewed on a computer monitor, or may be printed out using a color or black-and-white printer. Of course, the sepia and antiqued image files will likely include colors (originating in image file 10 or in the processing of image file 18 to produce files 14 or 52), which colors cannot be reproduced by a black-and-white printer. In other words, the original image, as well as image 18, image 12, image 14, image 52, and image 16 are likely to look substantially the same when viewed or printed in monochrome black and white. Thus, the best results for the present invention will be had by the use of a color printer or by using a color copier as an output device for hard copies of the image files, for example.

Those skilled in the art will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiments which have been described in detail herein. Rather, reference should be made to the appended claims which define the spirit and scope of the present invention.

What is claimed is:

1. A method of image processing, said method comprising steps of:

utilizing a red, green, blue (RGB) image file, transposing said RGB image file into a gray scale image file; and utilizing said gray scale image file to provide an image file, including a weighted combinatorial operation which is substantially 80 percent weight from said RGB image file, and substantially 20 percent weight from said gray scale image file.

2. The method of claim 1 wherein said transposing step includes the step of applying an algorithm to said RGB image file;

and utilizing the result of the application of said algorithm to said RGB image file as said gray scale image file.

3. The method of claim 2 further including applying in said transposing step substantially the following algorithm: 0.3R+0.6G+0.1B=1.0G, in which R stands for a red value of a RGB pixel, G stands for a green value of said RGB pixel, B stands for a blue value of said RGB pixel, and G stands for a luminosity value of a gray scale pixel of said gray scale image, and in which numerical values are subject to selective alteration and may be expressed as fractions instead of decimals.

4. The method of claim 1 wherein the step of utillzing said gray scale image file to provide an image file includes the step of applying a transposing algorithm to said gray scale image file to provide an image file selected from the group consisting of: a metallic image file, a sepia image file, and an antiquated image file.

5. The method of claim 4 further including the step of utilizing as said transposing algorithm, the relationship: gray=(64*Rin+160*Gin+32*Bin)/256; where R,G, and B stand for the respective red, green, and blue pixel values, and Red output (Rout)=(red_out[gray]); Green output (Gout)=(green_out[gray]); and Blue output (Bout=(blue_out[gray]).

6. The method of claim 4 wherein the step of providing said antique image file includes the step of first applying a transposing algorithm to said gray scale image file to produce a transposed gray scale image file, and then utilizing a weighted combinatorial process combining said transposed gray scale image file and said RGB image file to produce said antique image file.

7. The method of claim 6 further including the step of utilizing as said transposing algorithm, the relationship: gray=(64*Rin+160*Gin+32*Bin)/256; where R,G, and B stand for the respective red, green, and blue pixel values, and Red output (Rout)=(red_out[gray]); Green output (Gout)=(green_out[gray]); and Blue output (Bout=(blue_out[gray]).

8. The method of claim 6 further including the step of utilizing as said transposing algorithm, the relationship: gray=(64*Rin+160*Gin+32*Bin)/256; where R,G, and B stand for the respective red, green, and blue pixel values, and Red output (Rout)=(red_out[gray]*3+Rin)/4.; Green output (Gout=(green_out[gray]*3+Gin)/4.; and Blue output (Bout)=(blue_out[gray]*3+Bin)/4.

9. The method of claim 4 further including the step of displaying one of said gray scale image file, said metallic image file, said sepia image file, or said antique image file on a computer image display device.

10. The method of claim 4 further including the step of printing in tangible hard copy form one of said gray scale image file, said metallic image file, said sepia image file, or said antique image file.

11. A method of image processing and viewing, said method comprising steps of:

selecting a red, green, blue (RGB) image file, transposing said RGB image file into a gray scale (luma) image file; and modifying said gray scale image file by utilization of a weighted combinatorial process with substantially 80 percent weight percentage from said RGB image file, and substantially 20 percent weight percentage from said gray scale image file.

12. The method of claim 11 further including the step of modifying said gray scale image file by utilization of both a chromatic transposition, and by utilization of a weighted combinatorial process with said RGB image file to thereby provide an output image file.

13. The method of claim 11 further including the step of applying as said transposing step for providing from said RGB image file the gray scale image file substantially the algorithm: 0.3R+0.6G+0.1B=1.0G, in which R stands for a red value of a RGB pixel, G stands for a green value of said RGB pixel, B stands for a blue value of said RGB pixel, and G stands for a luminosity value of a gray scale pixel of said gray scale image.

14. The method of claim 11 further including the step of providing a metallic image file by combining said RGB image file and said gray scale image file.

15. The method of claim 11 further including the step of providing a sepia image file by applying a transposing algorithm to said gray scale image file, and in which this transposing algorithm has the relationship of: gray=(64*Rin+160*Gin+32*Bin)/256; where R,G, and B stand for the respective red, green, and blue pixel values, and Red output (Rout)=(red_out[gray]); Green output (Gout)=(green_out[gray]); and Blue output (Bout=(blue_out[gray]).

16. The method of claim 11 further including the step of providing an antique image file by first applying a transposing algorithm to said gray scale image file to produce a transposed gray scale image file, and then utilizing a weighted combinatorial process combining said transposed gray scale image file and said RGB image file to produce said antique image file, and wherein said transposing algorithm has the relationship: gray=(64*Rin+160*Gin+32*Bin)/256; where R,G, and B stand for the respective red, green, and blue pixel values, and Red output (Rout)=(red_out[gray]*3+Rin)/4.; Green output (Gout=(green_out[gray]*3+Gin)/4.; and Blue output (Bout)=(blue_out[gray]*3+Bin)/4.

* * * * *